Figure 4:
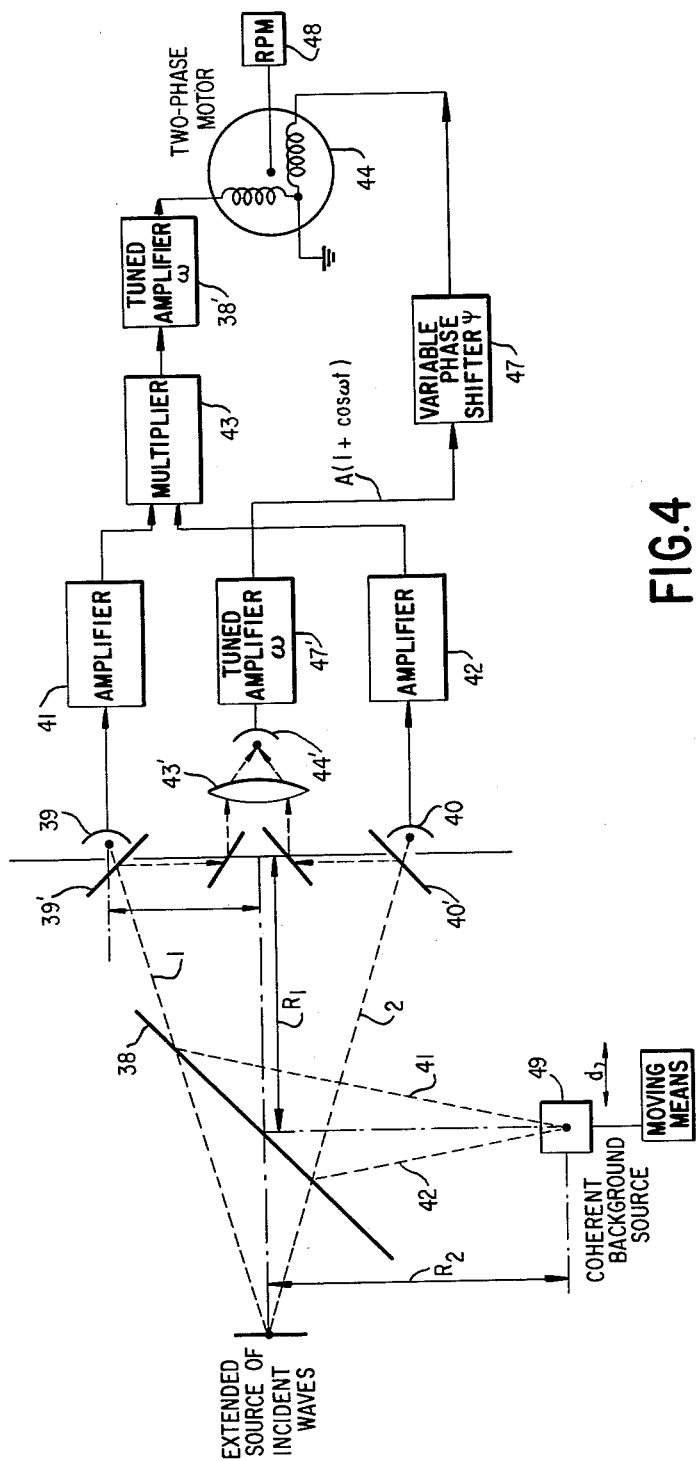

Dec. 8, 1964   H. GAMO   3,160,696
OPTICAL PHASE ANGLE MEASURING APPARATUS
Filed Dec. 30, 1960   7 Sheets-Sheet 1
FIG.I (PRIOR ART)
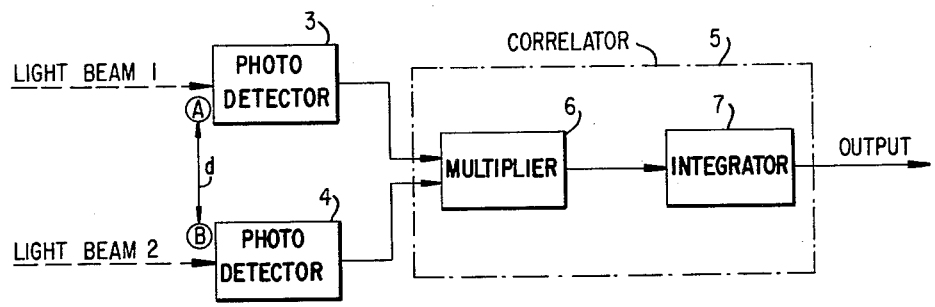
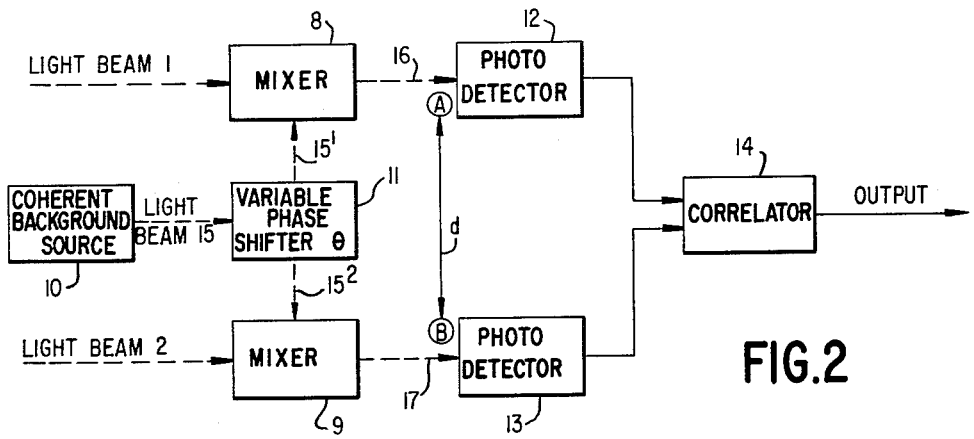
FIG.2
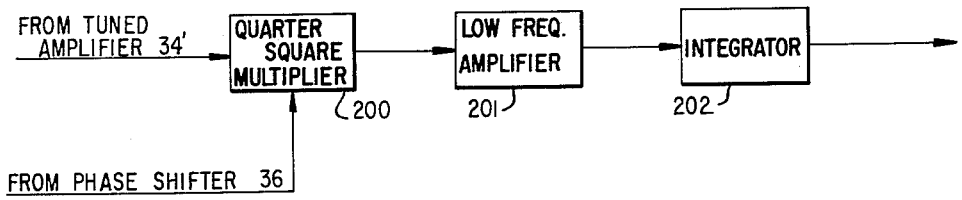
FIG.3a
INVENTOR.
HIDEYA GAMO
BY
Sughrue, Rothwell, Mion & Zinn
ATTORNEYS

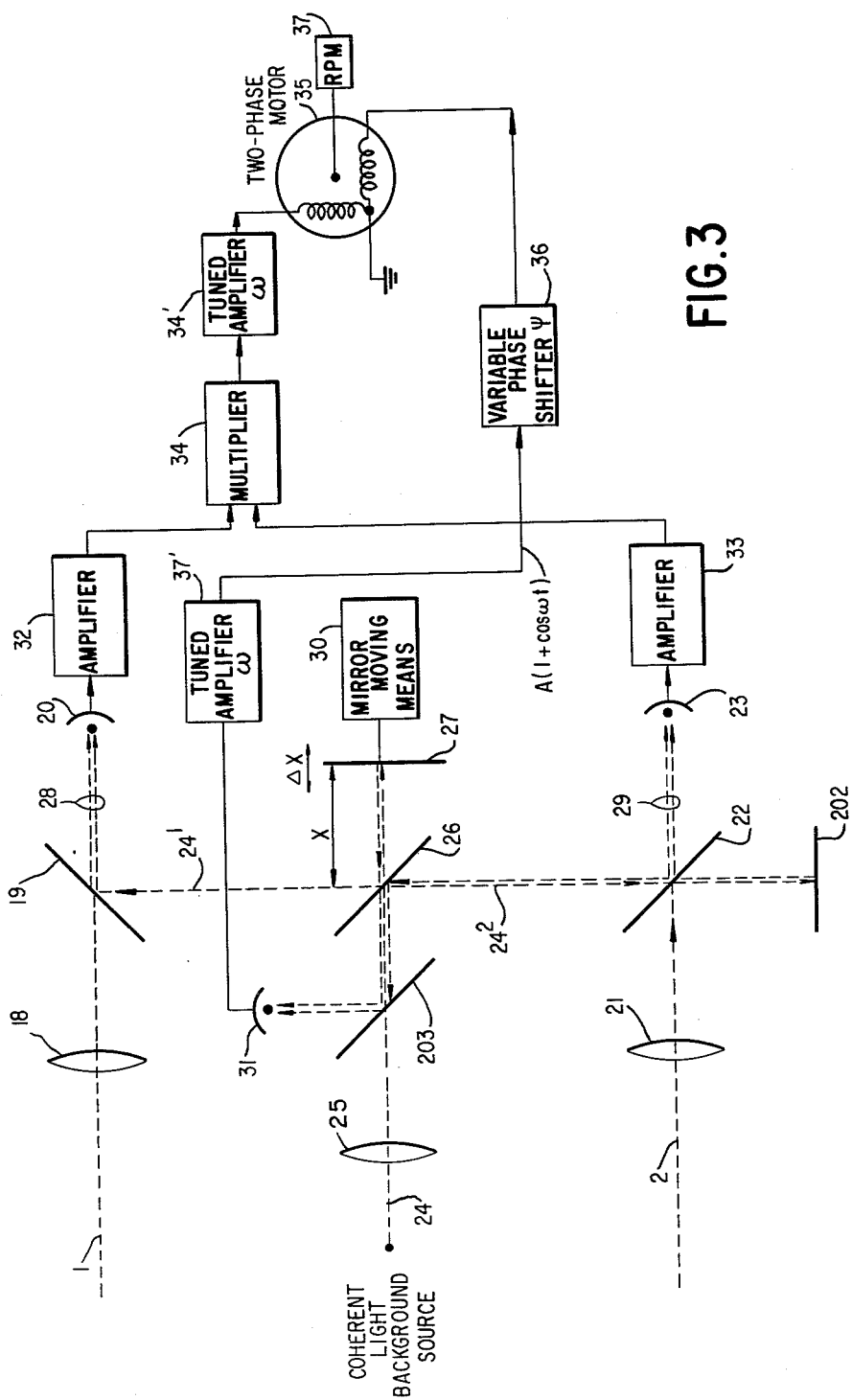

Dec. 8, 1964  H. GAMO  3,160,696
OPTICAL PHASE ANGLE MEASURING APPARATUS
Filed Dec. 30, 1960  7 Sheets-Sheet 6
FIG.7
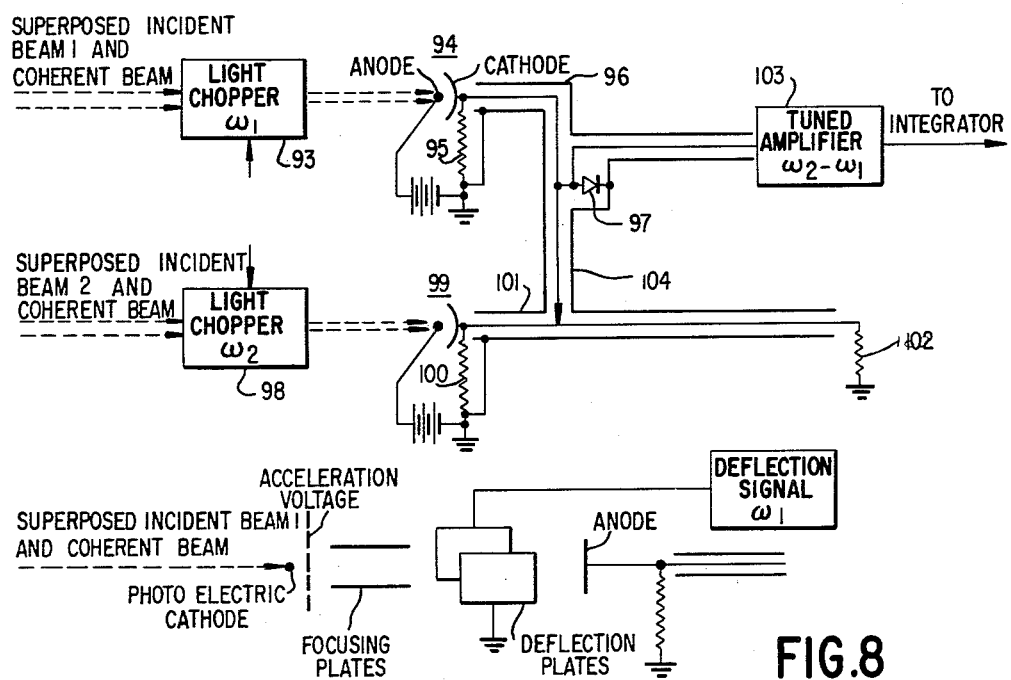
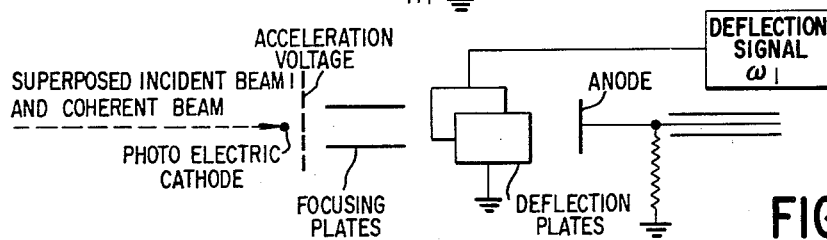
FIG.8
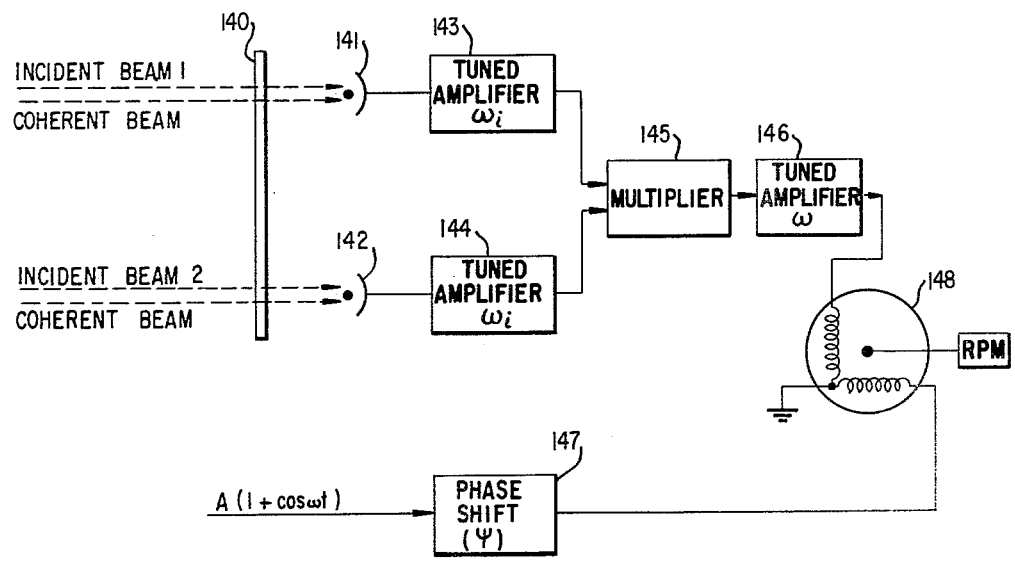
FIG.10

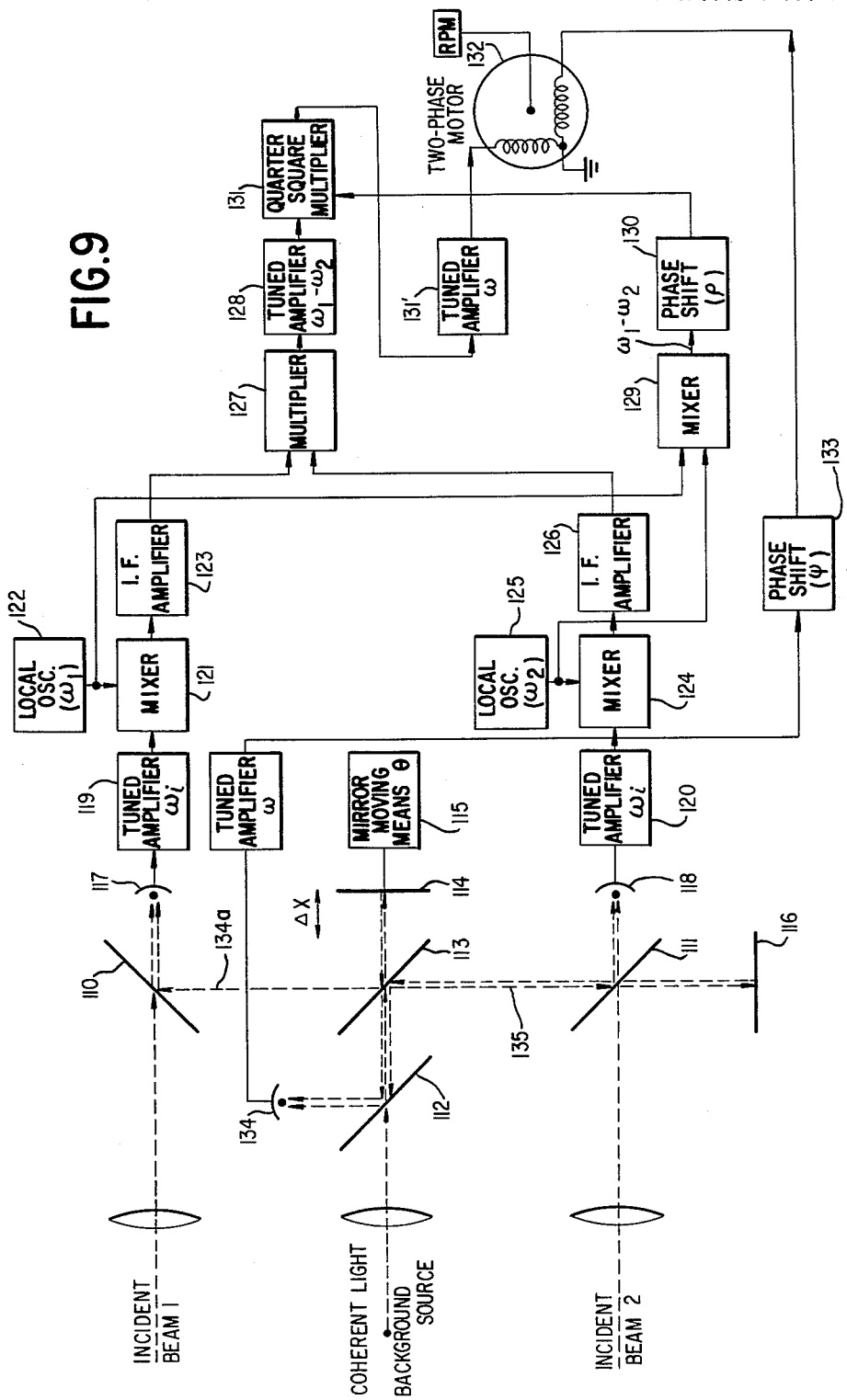

United States Patent Office 3,160,696
Patented Dec. 8, 1964

3,160,696
OPTICAL PHASE ANGLE MEASURING APPARATUS
Hideya Gamo, Katonah, N.Y., assignor to International Business Machines Corporation, New York, N.Y., a corporation of New York
Filed Dec. 30, 1960, Ser. No. 79,870
19 Claims. (Cl. 88—14)

This invention relates to optical measuring apparatus, and more particularly, to an intensity interferometer using coherent background.

Present day interferometry techniques have been strengthened by the development of the so-called intensity interferometer by Hanbury-Brown and Twiss, the theory and details of which may be found in the Proceedings of The Royal Society of London; vol. A 242, pages 300–324 (1957), and vol. A 243, pages 291–319 (1957), hereinafter referred to as Publications A and B. The original Hanbury Brown and Twiss intensity interferometer, as there described, offers experimental proof that the times of emission of photoelectrons at different points illuminated by coherent beams of light are partially correlated. The authors state that this result forms a basis for the claim that the correlation is essentially an interference effect exemplifying the wave, rather than corpuscular, aspect of light. The intensity interferometer therefore is quite important in modern physical optics, since it develops a correlation function for the intensity fluctuations in two coherent, or partially coherent, beams of light by sampling the currents from two photodetectors upon which said beams impinge.

The correlation function derived by the original Hanbury Brown and Twiss interferometer is proportional to the square of the absolute value of the phase coherence factor of the two beams. The phase coherence factor itself is a complex number having a phase as well as an absolute value. As will subsequently be pointed out, knowledge of this phase is desirable for certain measurements. However, such phase information cannot be conveniently ascertained from merely the square of the absolute value of the phase coherence factor.

It is therefore an object of the present invention to provide an intensity interferometer with a source of coherent background so that complete information about the phase coherence factor may be determined, including its phase.

Another object of the present invention is to provide means to measure the magnitude and phase of the phase coherence factor for any time delay.

Another object of the present invention is to provide a coherent background source for the direct measurement of the cross-spectral density of the incident beams.

Figure 5:
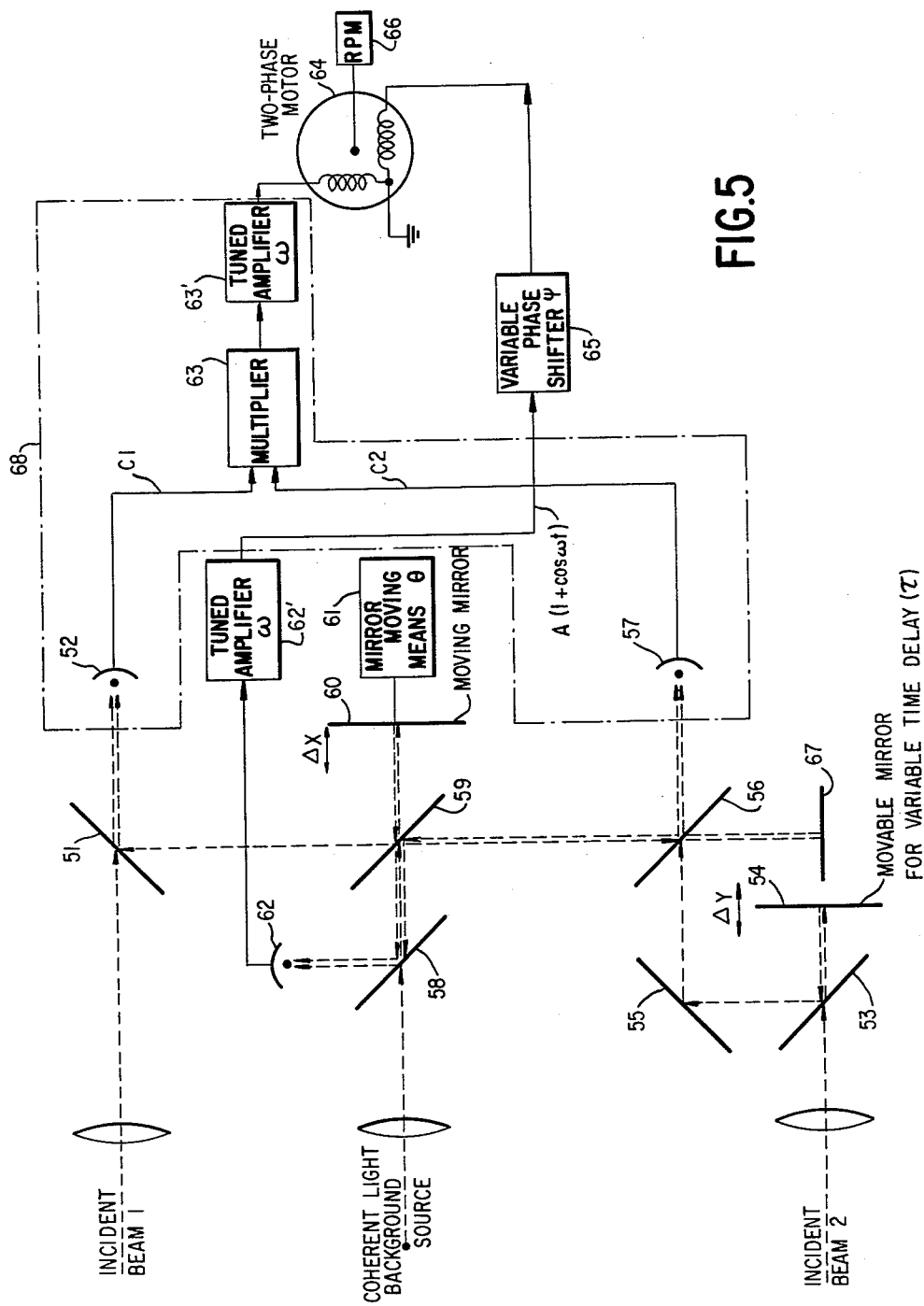
Figure 6:
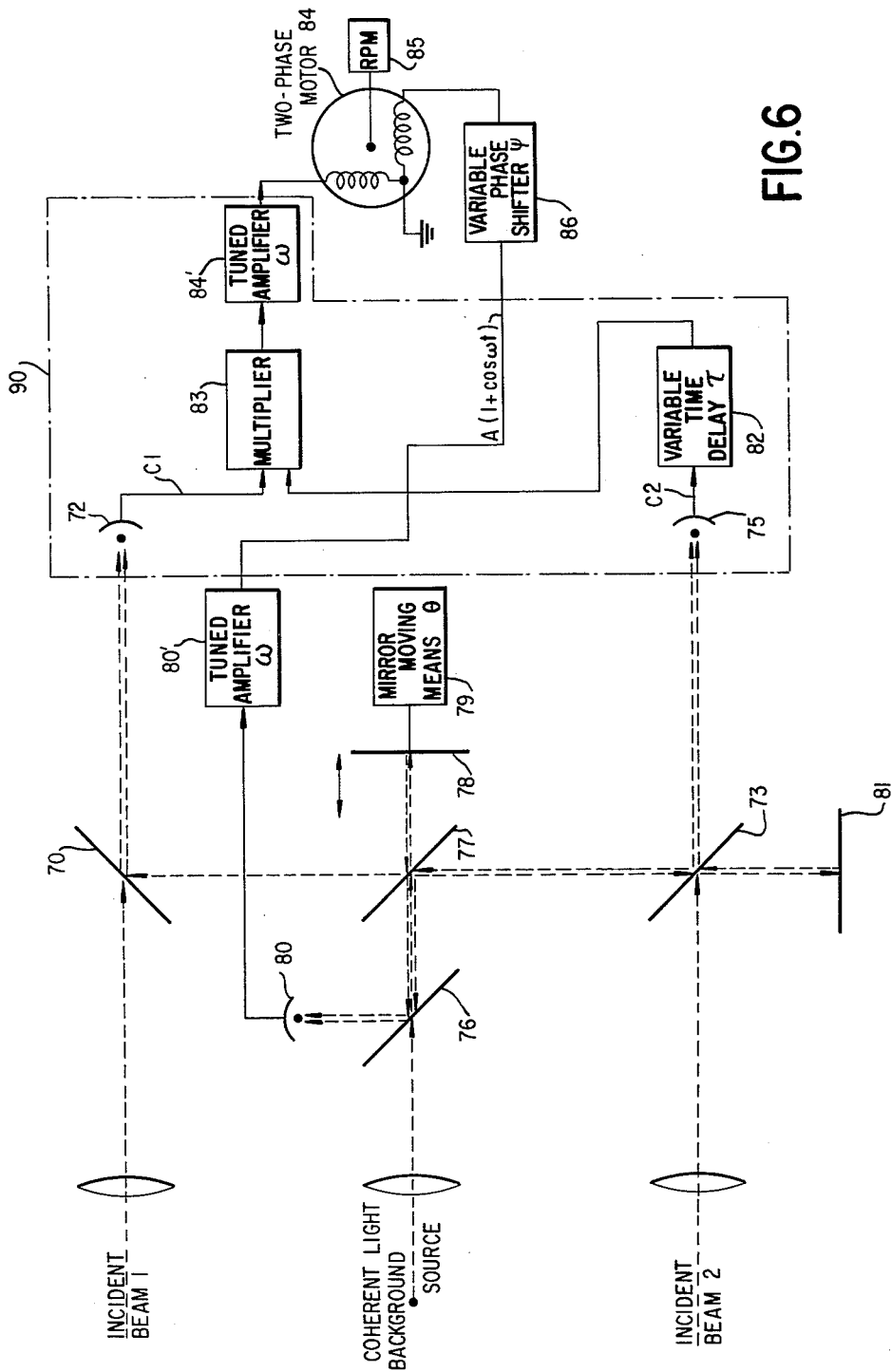

These and other objects of the invention will become apparent during the course of the following description, when taken in conjunction with the drawings, in which:

FIGURE 1 shows the prior art intensity interferometer;
FIGURE 2 shows a block diagram of the present invention with coherent background;
FIGURE 3 shows one embodiment of the present invention using coherent background for measuring the phase coherence factor;
FIGURE 3a shows an electronic synchronous detector for use in FIGURE 3;
FIGURE 4 shows a slightly different embodiment from that in FIGURE 2;
FIGURE 5 shows another embodiment of the present invention wherein the incident beams are delayed;
FIGURE 6 shows a slightly different embodiment than FIGURE 5;
FIGURE 7 shows one form of a multiplier for use in FIGURE 6;
FIGURE 8 shows a slightly different embodiment from that in FIGURE 7;
FIGURE 9 shows another embodiment of the present invention using coherent background for the measurement of cross-spectral density; and
FIGURE 10 shows a slightly different embodiment from that in FIGURE 9 for the measurement of cross-spectral density.

In order to fully appreciate the novel concepts of the present invention, reference will first be made to the intensity interferometer originally proposed by authors Hanbury-Brown and Twiss in publications A and B identified above. FIGURE 1 shows a simplified block diagram of this prior art device. Fully or partially coherent quasi-monochromatic light beams 1 and 2 are respectively incident on the two photodetectors 3 and 4, the output currents of which are proportional to the instantaneous intensity of light $I_1(t)$ and $I_2(t)$ and are directed to the correlator unit 5. In correlator 5, a multiplier 6 takes the product of the two currents which is then integrated with respect to time by integrator 7. The output from the integrator 7 is a measure of the cross correlation existing between the photon distributions in the light beams 1 and 2. Photodetectors 3 and 4 may have time constants greater than the coherence time of the incident beams, which is usually on the order of $3 \times 10^{-10}$ seconds. Multiplier 6 can be any one of many well known analog multipliers, while integrator 7 is shown by Hanbury-Brown and Twiss to be a motor having a linear relationship between speed and input voltage. Of course, any purely electronic integrating circuit may also be used.

According to the theory of Hanbury-Brown, Twiss, and others, the correlation coefficient between the light beams is given by the following formula:

$$<\Delta I_1 \Delta I_2> = \frac{\tau_c}{T}|\gamma_{12}|^2 <I_1><I_2> \qquad (1)$$

where $<\Delta I_1 \Delta I_2>$ is the correlation coefficient, $\tau_c$ is the coherence time of light, $T$ is the response time of the detector, $<I_1>$ and $<I_2>$ are the average values of light intensity at the inputs of the photodetectors 3 and 4, and $\gamma_{12}$ is the complex degree of coherence or normalized mutual coherence factor, for the light beams as measured between two points A and B, physically spaced $d$ distance apart, whereat detectors 3 and 4 are located. The $<>$ symbols surrounding the values $I_1$ and $I_2$ indicate that the integral with respect to time (usually, the observation time) is taken of the instantaneous light beam intensities at the respective photodetectors in order to obtain their time average, i.e., $\int_0^T I_1(t)dt = <I_1>$, and $$\int_0^T I_2(t)dt = <I_2>$$

The fluctuations (or A.C. values) of the light beam intensities are given by $\Delta I_1 = I_1 - <I_1>$, and $$\Delta I_2 = I_2 - <I_2> \cdot \Delta I_1$$

and $\Delta I_2$ are represented by the output currents from photodetectors 3 and 4, respectively, which are proportional thereto. Therefore, after multiplication and integration with respect to time, the output from integrator 7 is $<\Delta I_1 \Delta I_2>$, which, as defined above, is a measure of the correlation coefficient.

According to Principles of Optics, Born and Wolf, Pergamon Press (1959), page 504 (hereinafter referred to as Publication C), the complex degree of coherence $\gamma_{12}$ for quasimonochromatic light is defined to be the time average of the product of the wave amplitude of light at point A (FIGURE 1) and the complex conjugate of the wave amplitude of point B, divided by the product of the square roots of the intensities at these points. Thus, $$\gamma_{12} = \int_0^T V_1(t) V_2^*(t) dt / \sqrt{I_1} \sqrt{I_2}$$
$$\gamma_{12} = \langle V_1 V_2^* \rangle / \sqrt{I_1} \sqrt{I_2} \qquad (2)$$

where $V_1(t)$ = wave amplitude of light at point A, $V_2^*(t)$ = complex conjugate of wave amplitude of light at point B, and $I_1$ and $I_2$ = intensities of light at points A and B, respectviely. $\gamma_{12}$ is also termed the phase coherence factor and it is a complex number having both real and imaginary parts. In polar coordinate form, therefore, $\gamma_{12}$ may be represented as $|\gamma_{12}|(\cos\phi + i\sin\phi)$, or $|\gamma_{12}|e^{i\phi}$, where $|\gamma_{12}|$ is the absolute value of $\gamma_{12}$ and is equal to the square root of the sum of the squares of the X and Y vectors, while $\phi$ is the phase angle that $|\gamma_{12}|$ makes with the X axis. Physically, the angle $\phi$ may be defined geometrically as on page 508 of Publication C, which is herein incorporated by reference. For fully coherent light beams at points A and B, $|\gamma_{12}| = 1$, while for fully incoherent light beams, $|\gamma_{12}| = 0$. Therefore, for partially coherent light beams, $0 < |\gamma_{12}| < 1$.

One other important aspect of the phase coherence factor $\gamma_{12}$ should be mentioned here in order to later appreciate the distinction between the several species of the present invention. This factor, as defined above and as measured by Hanbury-Brown and Twiss, is derived by considering the light wave amplitude vibrations at points A and B at the same instant of time; hence, the terms $V_1(t)$ and $V_2^*(t)$ are employed in deriving Formula 2 and indicate that there is no difference between the times of arrival of corresponding portions of the two incident waves at their respective sampling points. However, if the vibrations at point B are considered at time $\tau$ later than those at point A (or vice versa), then wave amplitudes $V_1(t+\tau)$ and $V_2^*(t)$ must be used in deriving the phase coherence factor. In order to distinguish between the cases where $\tau = 0$ and $\tau \neq 0$, the term $\gamma_{12}(\tau)$ will be henceforth used for the latter. As will subsequently be explained, determination of the phase angle $\phi$ of a factor $\gamma_{12}(\tau)$, where $\tau \neq 0$, is important in the event that the cross spectral density of the incident light beams is desired. However, certain modifications to the intensity interferometer may be required due to the fact that the coherence time of light is extremely short.

It is therefore seen that while the original Hanbury-Brown and Twiss interferometer of FIGURE 1 provides a measure of the absolute value of $\gamma_{12}$ (since the correlation coefficient observed is proportional to $|\gamma_{12}|^2$), the phase $\phi$ of the phase coherence factor cannot be conveniently ascertained. Also, the shot noise in the optical region of the photodetectors, due to photoelectrons, is predominant over the wave interaction noise, so that all noise in the intensity interferometer of FIGURE 1 can be approximated by this shot noise which is given by $$\langle \Delta I^2 \rangle = \langle I \rangle$$

Therefore, the signal to noise ratio of FIGURE 1 is proportional to $$S/N \alpha I_1 I_2 |\gamma_{12}|^2 / \sqrt{I_1 I_2} \qquad (3)$$

Because $|\gamma_{12}|$ for partially coherent light is less than 1, the squaring of $|\gamma_{12}|$ results in a fairly low S/N figure.

Because of the reasons stated previously, the phase of the complex degree of coherence yields valuable information, especially when determining intensity distribution of a source or the phase of an illuminated object. An intensity interferometer measuring both phase and amplitude of the factor $\gamma_{12}$ is the subject of the present invention, which provides a coherent background source for the interferometer of Hanbury-Brown and Twiss. This novel feature is generally shown in block form in FIGURE 2. A beam of light 15 generated from a coherent source 10 is supplied to both input channels of the original Hanbury-Brown and Twiss interferometer as composed of photodetectors 12, 13, and correlator 14. Beam 15 is first divided into two separate beams $15^1$ and $15^2$ by a phase shifter 11 so that a phase difference of $\theta$ exists therebetween. The value of $\theta$ may be varied in a manner subsequently to be explained. Each beam $15^1$ and $15^2$ should have the same intensity $I_0$. Beam $15^1$ is then combined with beam 1 (having intensity $I_1$) at mixer 8 with the reesultant beam 16 (having intensity $I_1+I_0$) being incident upon photodetector 12. In like fashion, beam $15^2$ is combined with beam 2 (having intensity $I_2$) at mixer 9 with the resultant beam 17 (having intensity $I_2+I_0$) incident on photodetector 13. The coherent light background 10 should preferably be a stable monochromatic point source whose intensity is as high or higher than the incoming beams 1 and 2. In practice this coherent background may be provided by a mercury (Hg) 198 lamp commercially available having a spectrum of approximately 5461 A. The best source for this purpose would actually be a continuous wave optical maser.

The basic principle of operation of the modified interferometer of FIGURE 2 is the same as that shown in FIGURE 1, in that the cross correlation coefficient is taken of the two photodetector currents, which in turn are proportional to the intensities of the beams 16 and 17. Thus, the observed correlation becomes in this case $$\langle \Delta I_1' \Delta I_2' \rangle = \frac{\tau_c}{T} |\gamma_{12}'|^2 \langle I_1' \rangle \langle I_2' \rangle \qquad (4)$$

where $$\langle I_1' \rangle = \langle I_0 + I_1 \rangle, \quad \langle I_2' \rangle = \langle I_0 + I_2 \rangle, \quad \langle \Delta I_1' \Delta I_2' \rangle$$

is the correlation coefficient, and $\gamma_{12}'$ is the phase coherence factor.

The relation between the coherence factor $\gamma_{12}'$ of FIGURE 2 and the factor $\gamma_{12}$ of FIGURE 1 may be derived in the following manner. Since $$\gamma_{12} = \langle V_1 V_2^* \rangle / \sqrt{I_1 I_2} \quad (\text{Eq.2})$$

then $$\gamma_{12}' = \langle V_1' V_2'^* \rangle / \sqrt{I_1' I_2'} \qquad (5)$$

where $V_1'$ = wave amplitude of light beam 16 at point A, and $V_2'^*$ = complex conjugate of the wave amplitude of light beam 17 at point B. The magnitude of the wave amplitude $V_2'$ is attributable to the sum of the wave amplitude $V_2$ of beam 2 and of the wave amplitude of beam $15^2$ which can be represented by $V_0$. In like fashion, $V_1'$ is the sum of $V_1$ (wave amplitude of beam 1) and of the wave amplitude of beam $15^1$ which is represented by $V_0 e^{i\theta}$, where $\theta$ is the phase difference between beams $15^1$ and $15^2$. Thus, $$V_1' = V_1 + V_0 e^{i\theta} \qquad (6)$$
$$V_2' = V_2 + V_0 \qquad (7)$$

Substituting Equations 6 and 7 into Equation 5, we have $$\gamma_{12}' = \langle (V_1 + V_0 e^{i\theta})(V_2^* + V_0^*) \rangle / \sqrt{I_1' I_2'}$$
$$= \{ \langle V_1 V_2^* \rangle + \langle V_0^2 e^{i\theta} \rangle + \langle V_1 V_0^* \rangle$$
$$\qquad + \langle V_2^* V_0 e^{i\theta} \rangle \} / \sqrt{I_1' I_2'} \qquad (8)$$

Because the waves $15^1$ and $15^2$ from the coherent background 10 are statistically independent from the original incident waves 1 and 2, i.e., they are not in any way coherent, there can be no correlation between them, so that the terms $\langle V_1 V_0^* \rangle$ and $\langle V_2^* V_0 e^{i\theta} \rangle$ in Equation 8 must both equal zero. Furthermore, intensity is proportional to the square of wave amplitude such that $V_0^2 = I_0$. Since $I_1' = I_0 + I_1$ and $I_2' = I_0 + I_2$, Equation 8 now becomes $$\gamma_{12}^1 = \{ \langle V_1 V_2^* \rangle + I_0 e^{i\theta} \} / \sqrt{(I_1 + I_0)(I_2 + I_0)} \qquad (9)$$

Now according to Equation 2, $\gamma_{12} = \langle V_1 V_2^* \rangle / \sqrt{I_1 I_2}$. Therefore, Equation 9 becomes $$\gamma_{12}' = \{ \sqrt{I_1 I_2}\, \gamma_{12} + I_0 e^{i\theta} \} / \sqrt{(I_1 + I_0)(I_2 + I_0)} \qquad (10)$$

Equation 1 thereby shows the relationship between $\gamma_{12}'$ of FIGURE 2 and $\gamma_{12}$ of FIGURE 1. $\gamma_{12}$ is the phase coherence factor of the incident beams 1 and 2 under consideration, and may be expressed in polar coordinate form as $|\gamma_{12}|e^{i\phi}$. It should be appreciated in Equation 10 above that both $\gamma_{12}$ and $\gamma_{12}'$ refer to the case where there is no time delay ($\tau=0$) in considering the wave vibrations at the two photodetectors. The purpose of the intensity interferometer in FIGURE 2 is to enable the measurement of angle $\phi$ as well as $|\gamma_{12}|$.

To see how this is done, consider the expansion of Equation 4 when defining $\gamma_{12}'$ according to Equation 10. Since the square of the absolute value of a complex number is equal to the product of that number and its complex conjugate, $$|\gamma_{12}'|^2 = \gamma_{12}' \gamma_{12}'^*$$
$$= (\sqrt{I_1 I_2}\gamma_{12} + I_0 e^{i\theta})(\sqrt{I_1 I_2}\gamma_{12}^* + I_0 e^{-i\theta})/(I_0+I_1)(I_0+I_2)$$
$$= \{I_1 I_2 \gamma_{12}\gamma_{12}^* + I_0^2 e^{i\theta-i\theta}$$
$$+ I_0\sqrt{I_1 I_2}(e^{i\theta}\gamma_{12}^* + e^{-i\theta}\gamma_{12})\}/(I_0+I_1)(I_0+I_2)$$

Since $\langle I_1' \rangle = I_0 + I_1$, and $\langle I_2' \rangle = I_0 + I_2$, the observed correlation coefficient in FIGURE 2 is $$\langle \Delta I_1' \Delta I_2' \rangle = I_1 I_2 |\gamma_{12}|^2 + I_0^2$$
$$+ I_0\sqrt{I_1 I_2}(e^{i\theta}\gamma_{12}^* + e^{-i\theta}\gamma_{12}) \quad (11)$$

In Equation 11, the third term may be reduced as follows:

$$e^{i\theta}\gamma_{12}^* + e^{-i\theta}\gamma_{12} = e^{i\theta}(|\gamma_{12}|e^{-i\phi}) + e^{-i\theta}(|\gamma_{12}|e^{i\phi})$$
$$= |\gamma_{12}|e^{i\theta-i\phi} + |\gamma_{12}|e^{-i\theta+i\phi}$$
$$= |\gamma_{12}|e^{i(\theta-\phi)} + |\gamma_{12}|e^{-i(\theta-\phi)}$$
$$= |\gamma_{12}|(e^{i(\theta-\phi)} + e^{-i(\theta-\phi)}) \quad (12)$$

Since $e^{i\alpha} = \cos\alpha + i\sin\alpha$, the right-hand term of Equation 12 becomes $$= |\gamma_{12}|\{[\cos(\theta-\phi) + i\sin(\theta-\phi)] + [\cos(\theta-\phi) - i\sin(\theta-\phi)]\}$$
$$= 2|\gamma_{12}|\cos(\theta-\phi), \text{ or } 2[\gamma_{12}e_{-i\theta}]^{R'} \quad (13)$$

where the superscript R signifies that only the real term of the expanded bracketed value need be considered.

Thus, Equation 11 becomes $$\langle \Delta I_1' \Delta I_2' \rangle = I_1 I_2 |\gamma_{12}|^2 + I_0^2$$
$$+ 2I_0\sqrt{I_1 I_2}|\gamma_{12}|\cos(\theta-\phi) \quad (14)$$

From Equation 14 it may be understood that variation in the correlation coefficient, as represented by $\langle \Delta I_1' \Delta I_2' \rangle$ from the output of the correlator in FIGURE 2, depends only upon the phase angle $\theta$ of the optical phases shifter 11, since it can be assumed that the values $I_1$, $I_2$, $|\gamma_{12}|$, and $I_0$ remain constant. Therefore, the maximum output signal from the correlator is obtained when the phase $\theta$ of phase coherence factor $\gamma_{12}$ is cancelled by the phase difference $\theta$ in the coherent background applied to the two input channels. This is so, because when $\theta - \phi = 0$, $\cos(\theta-\phi) = 1$. The minimum output is similarly obtained when $\theta-\phi=\pi$, or an odd member multiple of $\pi$, since $\cos\pi = -1$. In the first of these cases, therefore, the term $2I_0\sqrt{I_1 I_2}|\gamma_{12}|$ is added to the other two terms in Equation 14, while the minimum signal case results in this term being subtracted therefrom.

A simple procedure for measuring the phase angle $\phi$ of the phase coherence factor $\gamma_{12}$ may be derived following the teachings above. By varying the angle $\theta$, by any one of a number of well known ways, the output from correlator 14 may be maximized, at which time $\theta$ will equal $\phi$. The absolute value of $|\gamma_{12}|$ may be ascertained by varying $\theta$ until the output is minimized, then apply the formula (Max-Min)/2. Another way is by merely discontinuing the use of the coherent background so that the correlator output equals $|\gamma_{12}|^2 \langle I_1 \rangle \langle I_2 \rangle$ as in FIGURE 1.

Concerning the signal to noise ratio S/N of the intensity interferometer with coherent background, the term $|\gamma_{12}|$ appears in Equation 14, and the signal is proportional to $I_0\sqrt{I_1 I_2}|\gamma_{12}|$. The noise is proportional to $\sqrt{I_1' I_2'}$ which equals $\sqrt{(I_0+I_1)(I_0+I_2)}$. Since $I_0$ is substantially higher than $I_1$ or $I_2$, $$\sqrt{(I_0+I_1)(I_0+I_2)} \alpha I_0$$

Therefore, the S/N of FIGURE 2 is proportional to $$S/N = I_0\sqrt{I_1 I_2}|\gamma_{12}|/I_0$$
$$= I_1 I_2 |\gamma_{12}|/\sqrt{I_1 I_2} \quad (15)$$

Comparing Equation 15 with Equation 3, it is seen that the S/N of FIGURE 2 varies according to $|\gamma_{12}|$ instead of $|\gamma_{12}|^2$ as in FIGURE 1. Since the phase coherence factor $|\gamma_{12}|$ is generally less than unity, this fact may be significant, especially where $|\gamma_{12}|$ is small.

FIGURE 3 shows a practical embodiment of the intensity interferometer with coherent background used for measuring the absolute value of $|\gamma_{12}|$ and its phase $\phi$. Light beam 1 is introduced via a focusing lens 18 to a half-silvered mirror 19 which transmits beam 1 with little or no attenuation to phototube 20. In like manner, beam 2 is passed via lens 21 and half-silvered mirror 22 to phototube 23. The background source provides a coherent beam 24 which is collimated when passing through lens 25 to half-silvered mirror 26 positioned so that half of the beam 24 intensity is reflected downward as beam $24^2$ to strike mirror 22, while the remainder of beam 24 passes through mirror 26 to strike mirror 27. The reflected beam from mirror 27 returns to mirror 26 and is reflected up as beam $24^1$ to strike mirror 19. Beams $24^1$ and $24^2$ are respectively reflected at mirrors 19 and 22 to combine with beams 1 and 2 to form beams 28 and 29.

A variable phase angle $\theta$ between beams $24^1$ and $24^2$ may be obtained by moving mirror 27 in a direction $\Delta x$ so that the distance $x$ changes. Thus, $$\theta = \frac{\Delta x}{\lambda} 4\pi$$

where $\lambda$ is the wavelength of the coherent background light. Although mirror 27 can conceivably be moved and set to any value of $\theta$, the exact measurement of $\theta$ may be difficult due to the extremely small values of $\Delta x$ and $\lambda$. A more practical scheme is that shown in FIGURE 3. Stationary mirror 202 is provided to reflect back a portion of beam $24^2$ to mirror 26 and thence to mirror 203. Also, a portion of beam $24^1$, as it returns from movable mirror 27, passes through mirror 26 to strike mirror 203. These two beams are reflected from mirror 203 up to a photodetector 31. A means 30 slowly moves mirror 27 continuously in the same direction $\Delta x$ for the duration of observation. The continuous change in phase of beam $24^1$, with respect to beam $24^2$, causes an interference effect at photodetector 31 which, via tuned amplifier $37^1$, generates a low frequency signal A $(1+\cos\omega t)$, where $\omega t = \theta$, and $\omega = 2dx/dt$ such that angle $\theta$ is modulated with respect to time. The purpose of this modulation of $\theta$ will subsequently be explained.

The current outputs from phototubes 20 and 23, which are proportional to the intensities $I_1'$ and $I_2'$ of beams 28 and 29, respectively, are fed to a multiplier 34. Amplification of these currents may first be required in amplifiers 32 and 33, which can also be provided by using photomultipliers having amplification due to secondary emission of electrons. The output current from multiplier 34 is applied after suitable amplification by tuned amplifier $34^1$, to one winding of two-phase motor 35. The input to the other winding of motor 35 is taken from the output of a variable phase shifter 36 which is used to vary the phase of the low frequency signal $A(1+\cos\omega t)$ from photodetector 31 by an amount $\psi$. Thus, the output from phase shifter 36 is $A[1+\cos(\omega t+\psi)]$. A counter or other such device 37 may be used to measure the total number of revolutions during the observation time, or the r.p.m.

In operation, the multiplier 34 in FIGURE 3 provides an output according to Equation 14 wherein the third term becomes $2I_0\sqrt{I_1I_2}|\gamma_{12}|\cos(\omega t-\phi)$, since $\theta=\omega t$. Because the first and second terms in this Equation 14 are clearly constant, the quantities corresponding to these terms will vanish after integration by the motor, so that only the third term contributes to any net rotation thereof. Since the output from phase shifter 36 is a current proportional to $A[1+\cos(\omega t+\psi)]$, it is observed that the term $\omega t$ in both inputs to motor 35 will cancel, so that the torque is proportional to $\cos(\phi-\psi)$, where $\phi$ is the phase angle of the phase coherence factor $\omega_{12}$. Therefore, by observing the maximum degree of motor rotation, which occurs when $\cos(\phi-\psi)=1$, the angle $\phi$ can be determined by noting the value of $\psi$. The advantage of measuring phase $\psi$ instead of phase $\theta$ is that the former is easily obtained from any well known calibrated electronic phase shifter 36 which operates on low frequency electric signals.

Instead of using the two-phase integrating motor 35, the same procedure may also be realized by a synchronous detector and integrating network, where the signal from multiplier 34 is detected under the presence of the signal phase shifter 36. Such a circuit is shown in FIGURE 3a, and may include a quarter square multiplier 200 such as is shown and described on page 281 of "Electronic Analog Computers," Korn and Korn, McGraw-Hill Publishing Co. (2d Ed.) 1956. This multiplier is responsive to the outputs from amplifier 34[1] and phase shifter 36 in FIGURE 3 to generate a signal proportional to their product, which in effect is the function also of motor 35. In order to eliminate higher order harmonics in this output, amplifier 201 may be provided having an upper cut-off frequency less than the value $\omega$. The output therefrom is then applied to some form of integrator 202, such as the well known capacitor type, for generating the final output signal over the observing time interval.

In the event that the maximum distance $\Delta x$ in FIGURE 3 is traversed before significant output results are obtained from the intensity interferometer, the direction of motion of mirror 27 may be reversed if the phase $\psi$ of shifter 36 is likewise changed in polarity. Using this procedure, the observation time may be extended indefinitely until a valid measurement is made.

FIGURE 4 shows intensity interferometer similar to that in FIGURE 3, except for a modification in the optical front end wherein the phase of the coherent background light is varied. The incident beams 1 and 2 to be analyzed are derived from an extended source so that they travel through a half-silvered mirror 38 on their way to phototubes 39 and 40, respectively. The coherent background source 49 is located so that its rays 41 and 42 reflect off of mirror 38 to become incident on phototubes 39 and 40. Mirror 38 and distance $R_2$ should be such that the mirror image of coherent source 49 should coincide with the center of the extended incident source of incident waves. By moving the coherent background source in a direction $d$, a phase difference $\theta$ between the coherent background beams 42 and 41 is created at photodetectors 39 and 40.

The low frequency signal corresponding to varying phase difference $\theta$ between the background beams is produced by a system similar to the Michelson stellar interferometer. Namely, the light beam 41 is reflected by a semi-transparent mirror 39[1] and is again reflected and introduced into a lens 43[1]. The other beam 42 is reflected and is introduced into the same lens 43[1]. The above two beams are superposed at the third photoelectric detector 44[1] by the above lens and produce interference pattern between the abovementioned beams. The output signal from photodetector 44[1] is given by $$A(1+\cos \omega t)$$

when source 49 is moved by means 48[1]. The interference between light beams from the extended source of object, which is assumed as not moving, should be constant. The output of photodetector due to the object source is easily eliminated by means of tuned amplifier 47[1]. Using the parameters $R_1$, $R_2$, $d$, and $r$ in FIGURE 4, it may be easily shown that $\theta$ (the phase difference between coherent beams 41 and 42 at photodetectors 39 and 40) is approximately equal to $$\frac{4\pi rd}{\lambda\sqrt{R_1^2+R_2^2}}$$

where $\lambda$ is the wavelength of the coherent background, and the value of $r$ is small compared to that of $\sqrt{R_1^2+R_2^2}$.

In FIGURE 4, the remainder of the interferometer to the right of the photodetectors is the same as shown in FIGURE 3, the operation of which has already been described.

Turning to FIGURES 5 and 6, further embodiments of the present invention will be described. As has already been explained, the discussion given in connection with FIGURES 1, 2, and 3 is limited to the case where $\tau=0$, i.e., where corresponding portions of the light vibrations are considered at the same time. An extension of this technique also provides for the measurement of $\alpha_{12}(\tau)$, where $\tau\neq 0$. This quantity is of particular importance where it is desired to calculate the cross spectral density $G_{12}(V)$ of the amplitude fluctuations of incident beams 1 and 2 according to the following formula $$G_{12}(V)=\int_{-\infty}^{+\infty}\gamma_{12}(\tau)e^{-i2\pi v\tau}d\tau \quad (16)$$

where V is the frequency under examination, while $\gamma_{12}(\tau)$ and $\tau$ are as defined above. The function $G_{12}(V)$ represents the amplitude correlation between points one and two at frequency V and is the optical analog of the concept of cross-power spectrum in the theory of stationary random processes. Equation 16 shows that the functions $\gamma_{12}(\tau)$ and $G_{12}(V)$ form a Fourier transform pair. Since $\gamma_{12}(-\tau)=\gamma_{12}^*(\tau)$ (using the analytic signal form as described by Principles of Optics, pages 493 et seq.), and $\gamma_{12}(\tau)=|\gamma_{12}(\tau)|e^{i\phi(\tau)}$, Equation 16 becomes $$G_{12}(v)=\int_0^{+\infty}|\gamma_{12}(\tau)|\cos\{2\pi v\tau-\phi(\tau)\}d\tau \quad (17)$$

From Equation 17, it is seen that the spectrum is limited to the positive frequency. Therefore, the amplitude of any frequency component present in the interfering light beams may be mathematically calculated provided that the value of $\gamma_{12}(\tau)$ is known for all values of $\tau$ having the range $0\leq\tau\leq\infty$. A simplified formula for calculating $G_{12}(V)$, using only certain specific values of $\tau$, will subsequently be developed.

It should be appreciated that the value of $\gamma_{12}(\tau)$ used in the above calculations includes both its real and imaginary parts, thus calling for the measurement of its phase $\phi$ as well as absolute magnitude. This measurement may be made by the apparatus in either FIGURE 5 or FIGURE 6. Newly added mirrors 53, 54, and 55 in FIGURE 5 are provided to change the optical path length of the incident beam 2, so as to introduce a time delay $\tau$ into this beam at photodetector 57 when compared with the incident beam 1 at photodetector 52. Incident beam 2 is directed through a half-silvered mirror 53 to be reflected back thereto from mirror 54. The reflected beam 2 then is reflected from mirror 53 to mirror 55 and thence to be combined with the coherent beam at mirror 56. Mirror 54 may be moved to any position $\Delta y$ so as to vary the optical path traversed by beam 1 in reaching photodetector 57. When using the coherent background for measuring the phase angle $\phi$ of $\gamma_{12}(\tau)$, the operation of FIGURE 5 may be described as in Equations 4, 10, and 14, except that the term $\gamma^{12}(\tau)$ appears, instead of $\gamma_{12}$ (indicating that $\tau=0$).

Thus, $$<\Delta I_1'(t)\Delta I_2'(t+\tau)>=I_1(t)I_2(t+\tau)|\gamma_{12}(\tau)|^2+I_0^2$$
$$+2I_0\sqrt{I_1(t)I_2(t+\tau)}|\gamma_{12}(\tau)|\cos(\theta-\phi) \quad (18)$$

Equation 18 should be compared with Equation 14. As with FIGURE 3, any variation in the correlation coefficient for a particular value of $\tau$ when using coherent background, is due to a change in the phase angle $\theta$. Thus, when $\theta$ cancels the phase angle $\phi$ of $\gamma^{12}(\tau)$, maximum output is obtained. Mirrors 58 and 67, together with photodetector 62 and phase shifter 65, may be provided in FIGURE 5 as was done in FIGURE 3 so that the $\theta$ components applied to the two-phase motor 64 will cancel, leaving the phase $\psi$ as the observable parameter when the output is maximum.

FIGURE 6 shows a device similar to that of FIGURE 5 for the measurement of $\gamma_{12}(\tau)$, using coherent background, where the delay $\tau$ is performed on one of the photodetector currents before it reaches the multiplier. Theoretically, the insertion into the original Hanbury-Brown and Twiss interferometer of a delay $\tau$ (unit 82) between the output of one photodetector 75 and the multiplier 83, such as is shown in FIGURE 6, results in the measured correlation function being proportional to the square of the absolute value of $\gamma_{12}(\tau)$ according to the following formula:

$$<\Delta I_1(t)\Delta I_2(t+\tau)> = |\gamma_{12}(\tau)|^2 <I_1><I_2> \quad (19)$$

since the output currents from the photodetectors are proportional to the respective light beam intensities so that a delay ($\tau$) of the current in one of said channels before reaching the multiplier is equivalent to considering the light vibrations at said channel at a time ($\tau$) later than those at the other channel. Now, by superimposing the monochromatic and coherent background onto the incident beams at the photodetectors, such as is done in FIGURE 6, the measured cross-correlation function becomes $$<\Delta I_1'(t)\Delta I_2'(t+\tau)> = |\gamma_{12}'(\tau)|^2 <I_1'><I_2'> \quad (20)$$

where the above quantities are defined as in Equation 4. The relation between $\gamma_{12}'(\tau)$ of Equation 20 and $\gamma_{12}(\tau)$ of Equation 19 may be derived in the same manner as set forth by Equations 5, 6, 7, 8, and 9, keeping in mind that the total phase difference between the split beams of coherent background is now equal to $\theta + \omega_0\tau$, where $\theta$ is the change in phase due to the phase shifter 79, and $\omega_0\tau$ is the change in phase due to the delay 82, where $\omega_0$ is $2\pi$ times the frequency of the coherent light. Thus, $$\gamma_{12}'(\tau) = \{\sqrt{I_1 I_2}\gamma_{12}(\tau) + I_0 e^{i(\omega_0\tau+\theta)}\}/\sqrt{(I_1+I_0)(I_2+I_0)} \quad (21)$$

Equation 21 should be compared with Equation 10, the latter being developed while considering that $\tau=0$, so that $\omega_0\tau=0$.

Now expanding Equation 21 by the method taught in Equations 11, 12, and 13, it is found that $$<\Delta I_1'(t)\Delta I_2'(t+\tau)> = I_1(t)I_2(t+\tau)|\gamma_{12}(\tau)|^2 + I_0^2 +$$
$$2I_0\sqrt{I_1(t)I_2(t+\tau)}|\gamma_{12}(\tau)|\cos(\omega_0\tau+\theta-\phi) \quad (22)$$

It can be seen from Equation 22 that the output from the correlator is maximum for any set value of $\tau$, when the phase $\phi$ of $\gamma_{12}(\tau)$ cancels the phase $\omega_0\tau+\theta$, or when $(\omega_0\tau+\theta-\phi)=2\pi\eta$, with $\eta=0,1\ldots$. Since both $\omega_0$, $\tau$, and $\theta$ may be determined by conventional means, the value of $\phi$, for any $\tau$, may likewise be determined according to the principles hereinbefore described, as well as the absolute value of $\gamma_{12}(\tau)$. FIGURE 6 also incorporates motor means 79 for moving mirror 78 in a manner previously described, together with means 76, 81, and 80 for developing a signal $\Delta(1+\cos\omega t)$. Phase shifter 86 provides a shift of $\psi$, the value of which is equal to $\theta$ for purposes of providing maximum rotation of motor 84.

In order to successfully measure $\gamma_{12}(\tau)$ by the apparatus shown in FIGURE 5 or in FIGURE 6, an important requirement is that the photodetectors together with multiplier must have a response time $T_R$ that is much smaller than the coherence time $T_C$ of the light incident on the photodetectors. The average coherence time for light under consideration is approximately $3 \times 10^{-10}$ seconds. If the response times (or time constants) of the above-mentioned components are larger than this coherence time, the correlation function $<\Delta I_1(t)\Delta I_2(t+\tau)>$ becomes independent of $\tau$. Thus, high speed components 52, 57, 63, and 72, 75, 83 are essential in FIGURE 5 and FIGURE 6, respectively. Photomultiplier tubes commercially available may not satisfy this requirement since their time constants are, for practical purposes, limited by the spread in transit time through the multiple amplification stages due to the secondary electron emission. However, the delay in the photoelectron emission process, itself, is much less than $10^{-10}$ seconds, as was experimentally shown by Forrester et al. Physical Review, vol. 99, page 1691 (1955). This phenomenon may be used in developing a high speed unit for carrying out the functions of FIGURE 5 and FIGURE 6.

When the phase difference $\theta$ is cyclically modulated such that $\theta=\omega t$, then the physical details of blocks 63 and 90 in FIGURES 5 and 6, respectively, may assume the following form. Each photoelectron emitted from the cathode of a photodetector is collected by its anode to which is coupled a coaxial transmission line C1 or C2. The transfer of a photoelectron from cathode to anode generates an electromagnetic wave front which propagates down the line at the light speed. The coaxial lines may be diagrammatically represented as in FIGURE 7, which is an alternative form of high speed multiplier than the one presently being explained. The multiplying circuit in FIGURES 5 and 6 may consist of a semiconductor diode (such as 97 in FIGURE 7), acting as a square law detector. Such diodes have an extremely fast response time, and, when used in their non-linear region, can perform a squaring operation on the absolute value of an input signal thereto as is well known in the art. The two signals $I_1'$ and $I_2'$ from the photodetectors are therefore first summed together, then applied to the diode for squaring, as may be seen in the multiplying circuit of FIGURE 7. The output from the multiplier is then applied to amplifiers 63[1] and 84[1] (FIGURE 5 or 6) which is tuned to extract signals having the frequency characteristic $\omega$, which is the modulation frequency of the coherent phase difference $\theta$. This tuned amplifier has a time response much larger than the coherence time of the light.

The operation of the above-described circuit is as follows: For the sake of simplifying the following analysis, assume that $\tau=0$. Let $V_1(t)$ and $V_{10}(t)$=the wave amplitudes of the incident beam 1 and coherent beam, respectively, at the channel 1 photodetector, and $V_2(t)$ and $V_{20}(t)$=the wave amplitudes of the incident beam 2 and coherent beam, respectively, at the channel 2 photodetector. As previously noted in connection with Equations 6 and 7, $V_{20}(t)=V_{10}(t)e^{i\theta}$. The resultant wave amplitude at the first and second photodetectors, respectively, is therefore $V_1(t)+V_{10}(t)$, and $V_2(t)+V_{20}(t)$. Hereafter, the independent variable ($t$) will be omitted from the equations.

Since the currents $I_1'$ and $I_2'$ represent intensity which is equal to the square of the absolute value of wave amplitude, then $$I_1' = \alpha_1|V_1+V_{10}|^2 \quad (23)$$
$$I_2' = \alpha_2|V_2+V_{20}|^2 \quad (24)$$

where $\alpha_1$ and $\alpha_2$ are photodetector parameters. Summing together $I_1'$ and $I_2'$, then applying this sum to the diode square law detector, the output therefrom assumes the following form when neglecting parameters $\alpha_1$ and $\alpha_2$:

$$|I_1'+I_2'|^2 = |I_1'|^2 + |I_2'|^2 + 2|I_1'I_2'| =$$
$$|V_1+V_{10}|^4 + |V_2+V_{20}|^4 + 2|V_1+V_{10}|^2|V_2+V_{20}|^2 \quad (25)$$

Because of the extremely high frequencies of the first and second terms in Equation 25, only the third term $$2|V_1+V_{10}|^2|V_2+V_{20}|_2$$

need be analyzed. When this term is expanded, and its high frequency terms eliminated (because of tuned amplifier 63' or 84'), then the resulting output from block 68 or 90 is $V_2^*V_1V_{10}^*V_{20}+V_1V_2^*V_{10}V_{20}^*$. Since the tuned amplifier performs an integration function with respect to the $V_1$ and $V_2$ signals (because of its slow response time, then the output may be represented as $$<V_2^*V_1>V_{10}^*V_{20}+<V_1V_2^*>V_{10}V_{20}^*$$

Since $<V_2^*V_1>=\Gamma_{12}^*$ (unnormalized phase coherence factor), $<V_1V_2^*>=\Gamma_{12}$, $V_{10}^*V_{20}=e^{i\theta}$ and $V_{10}V_{20}^*=e^{-i\theta}$ then the output from the tuned amplifier as the time response thereof approaches $\infty$ is $|\Gamma_{12}|e^{i\vartheta}$. Thus, the high speed components described above perform correlation on the photodetector outputs, and may be used even when $\tau \neq 0$.

In the event that angle $\theta$ is not modulated according to $\omega t$, but instead is adjusted manually or otherwise, a slightly different high speed multiplier must be used. In FIGURE 7 are shown details of such a high speed unit which may be substituted for the contents of the dot-dash block 68 in FIGURE 5 and the dot-dash block 90 in FIGURE 6 when the phase shifter $\psi$ and a synchronous detector are not used. The superposed incident beams and coherent beams for each channel are applied to photodetectors 94 and 99 via low frequency light choppers 93 and 98, respectively. Light choppers 93 and 98 modulate the amplitudes of the incident light waves thereon at frequencies of $\omega_1$ and $\omega_2$, respectively. They may take any one of several well known forms, such as a rotating sector or the like. After leaving the light choppers, the respective beams impinge upon the cathodes of detectors 94 and 99, causing photoelectron emission having a time constant less than $10^{-10}$ seconds, as discovered by Forrester et al. Each photoelectron emitted from the cathode is collected by the anode to which is coupled a coaxial transmission line. The transfer of a photoelectron from cathode to anode generates an electromagnetic wave front which propagates down the coaxial line at the light speed.

At photodetector 94, line 96 is connected to the anode, together with a resistor 95 which should be matched with the characteristic impedance of the line for maximum energy transmission. In like fashion, resistor 100 at photodetector 99 provides a matching function. When an electrical delay $\tau$ is used, such as in FIGURE 6, coaxial line 101 is a finite length and is terminated by a resistor 102 of such magnitude that no reflections occur. A movable tap coaxial line 104 is provided to pick off the wave from line 101 at any one of a number of points. This feature provides an electrical, variable, discretely incremented delay $\tau$. When an optical delay is utilized, as in FIGURE 5, then coaxial line 101 is joined directly with line 96.

The signals from lines 96 and 104 (or 101) are summed together and then applied to a multiplying circuit comprised of a semiconductor diode 97 acting as a square law detector. Diode 97 may be made of silicon, and it has an extremely fast response time within the frequency range under consideration ($10^{11}-10^{12}$ c.p.s.). The output from the detector 97 is applied to an amplifier tuned to pass only components having the beat frequency $\omega_2-\omega_1$, where these two frequencies are the modulating frequencies of light choppers 93 and 98. Amplifier 103 may have a slow response time.

In operation, the output signal from photodetector 94 can be represented by the term $I_1e^{i\omega_1t}$, while that from photodetector 99 is $I_2e^{i\omega_2t}$. Both $I_1$ and $I_2$ are complex quantities. These signals are first summed $$(I_1e^{i\omega_1t}+I_2e^{i\omega_2t})$$

and then squared by diode 97, so that the resulting signal to amplifier 103 is $I_1^2e^{2i\omega_1t}+I_2^2e^{2i\omega_2t}+2I_1I_2e^{i(\omega_2-\omega_1)t}$. Since amplifier 103 passes only the component having the beat frequency $\omega_2-\omega_1$, the side components of $I_1^2$ and $I_2^2$ are filtered out, leaving a signal proportional to the product $I_1I_2$. This signal may then be integrated with respect to time to obtain the correlation.

A rigorous analysis of the above-described high speed unit indicates that it will provide correct answers when analyzing light beams having a narrow frequency bandwidth (about 100 kc.), if the modulating frequencies $\omega_1$ and $\omega_2$ are quite low (about 100 c.p.s.). The beat $\omega_2-\omega_1$ should also be small.

An alternative scheme to the optical modulation shown in FIGURE 7 is that shown in FIGURE 8. No light choppers are used prior to the photodetectors. Instead, the photocathode is substituted for the thermoelectric emitter surface of a cathode type ray tube, with the collecting anode serving as a target. Acceleration and focusing voltages are provided, as well as a set of deflection plates. A low frequency deflection signal, either electromagnetic or electrostatic in nature, is then applied to modulate the magnitude of the signal E at the output of the anode. FIGURE 8 shows only one of the photodetectors, however, two of these are required for the two channels. It is also possible to employ the mulitplying circuits of FIGURES 7 and 8 when the coherence phase $\theta$ is modulated according to $\omega t$.

Concerning the signal to noise $S/N$ ratio of the embodiments shown in FIGURES 5 and 6, an analysis similar to the one made for FIGURE 3 can be performed. This shows that $S/N$ is proportional to $\sqrt{I_1I_2}|\alpha_{12}(\tau)|$ when using coherent background, while it is proportional to $\sqrt{I_1I_2}|\alpha_{12}(\tau)|^2$ without coherent background. These figures should be compared with Equations 15 and 3, respectively.

As previously mentioned in connection with Equation 17, the cross-spectral density $G_{12}(V)$ may be calculated for any V by taking the Fourier transform of $\alpha_{12}(\tau)$. This method involves determining each value of $\alpha_{12}(\tau)$ when $\tau$ has a range of 0 to $\infty$. When certain boundary conditions are established, Equation 17 may be transformed into a series expansion which uses discrete values of $\gamma_{12}(\tau)$. Such discrete values of $\tau$ may be easily obtained by the movable tap delay arrangement shown in FIGURE 6, or by the optical delay arrangement in FIGURE 5. This simplified formula may be derived as follows: From Equation 16, the value of $\gamma_{12}(\tau)$ is $$\gamma_{12}(\tau) = \int_0^\infty G_{12}(v)e^{2\pi i v \tau}dv \qquad (26)$$

since $\alpha_{12}(\tau)$ and $G_{12}(V)$ are Fourier transform pairs. Now assume that the highest frequency in $G_{12}(V)$ is $V_0$. Then, $G_{12}(V)$ can be represented by the Fourier series $$G_{12}(v) = \sum_{n=-\infty}^{+\infty} \alpha_n e^{i2\pi n v/v_0} \qquad (27)$$

where $$\alpha_n = \frac{1}{v_0}\int_0^{v_0} G_{12}(v)e^{i2\pi n v/v_0}dv \qquad (28)$$

Comparing Equations 26 and 28, $$\alpha_n = \frac{1}{v_0}\gamma_{12}(n/v_0) \qquad (29)$$

$$\alpha_n = \frac{1}{v_0}\gamma_{12}(-n/v_0) = \frac{1}{v_0}\gamma_{12}^*(n/v_0) \qquad (30)$$

Next inserting Equations 29 and 30 into Equation 27, the Fourier transform of $\gamma_{12}(\tau)$ is obtained by using its sampling values; namely $$G_{12}(v) = \frac{1}{v_0}\gamma_{12}(0) + \frac{2}{v_0}\sum_{n=1}^{+\infty}|\gamma_{12}(n/v_0)|\cos\left[\frac{2\pi v}{v_0}-\phi(n/v_0)\right] \qquad (31)$$

where discrete values of $\tau=n/v_0(n=0, 1, \ldots \infty)$ are employed. Thus, when employing the apparatus of FIGURE 5 or FIGURE 6 for purposes of measuring $\gamma_{12}(\tau)$ and its corresponding phase $\phi(\tau)$, for use in Equation 31, only certain discrete delays $\tau$ need be supplied. It should be noted, however, that the Equation 31 may only be valid in the case where the incident light falling on the two photodetectors is a portion of a uniform plane wave emanating from a source whose spectrum is to be analyzed. In this case, $G_{12}(\tau) = G_{11}(\tau)$, so that essentially an autocorrelation is derived of the intensity fluctuations.

The circuit of FIGURE 9 provides means, through the use of coherent background, to measure the value of $G_{12}(V)$ directly without need for the mathematical calculations shown by Equation 31. The superpositioning of the phase shifted ($\theta$) coherent beams 134 and 135 upon incident beams 1 and 2, respectively is performed by structure as previously shown in FIGURE 6. The currents from photodetectors 117 and 118 are transmitted to tuned amplifiers 119 and 120, respectively, each of which is selectively settable to any frequency $\omega_i$ which is in the spectrum of the incident beams. The outputs from tuned amplifiers 119 and 120 are respectively mixed with outputs from the local oscillators 122 and 125 at mixers 121 and 124. Local oscillator 122 has a frequency of $\omega_1$, so that the output signal from mixer 123 has a frequency $\omega_i - \omega_1$. Likewise, the output from mixer 124 has a frequency $\omega_i - \omega_2$. After these signals have respectively passed through I.F. amplifiers 123 and 126, they are multiplied together in multiplier 127. This operation results in an output signal having a frequency $\omega_1 - \omega_2$ which is then passed through the tuned low frequency amplifier 128 ($\omega_1 - \omega_2$) to one input of a quarter square multiplier 131 constructed according to page 281 of the aforementioned book "Electronic Analog Computers." The local oscillator frequencies $\omega_1$ and $\omega_2$ are also beat together at mixer 129 to generate a signal having a frequency $\omega_1 - \omega_2$. This signal is applied to a variable phase shifter 130 which shifts its input signal $\omega_1 - \omega_2$ by an angle $\rho$. Thereafter, the signal is applied to the other input of multiplier 131.

The output of multiplier 131 is a measurement of the function $\Phi_{12}^1(\omega_i)e^{-i\rho}$, where $\Phi_{12}^1(\omega_i)$ is defined as the cross-spectral density of intensity fluctuations of the superposed light beams at photodetectors 117 and 118. The quantity $\Phi_{12}^1(\omega_i)$ may be mathematically derived by applying a Fourier transformation to the cross-correlation function defined by Equation 22 in accordance with the Wiener-Khintchine theorem in the theory of stochastic processes. Thus, $$\int_{-\infty}^{+\infty} <\Delta I_1'(t)\Delta I_2'(t+\tau)> e^{-\omega_i \tau} d\tau =$$
$$\int_{-\infty}^{+\infty} I_1(t)I_2(t+\tau)|\gamma_{12}(\tau)|^2 e^{-\omega_i \tau} d\tau + \int_{-\infty}^{+\infty} I_0^2 e^{-\omega_i \tau} d\tau +$$
$$\int_{-\infty}^{+\infty} 2I_0\sqrt{I_1(t)I_2(t+\tau)}\,[\gamma_{12}(\tau)e^{-i(\omega_0 \tau + \theta)}]^R e^{-i\omega_i \tau} d\tau \quad (32)$$

In Equation 32 above, the bracketed expression $$[\gamma_{12}(\tau)e^{-i(w_0 \tau + \theta)}]^R$$

in the third term represents its real part. The complete third term of Equation 28, which is the only one depending on $\theta$, may be reduced to the following:

$$\int_{-\infty}^{+\infty} 2I_0\sqrt{I_1 I_2}[\gamma_{12}(\tau)e^{-i(\omega_0 \tau + \theta)}]^R e^{-i\omega_i \tau} d\tau = I_0\sqrt{I_1 I_2}\left[e^{-i\theta}\int_{-\infty}^{+\infty}\gamma_{12}(\tau)e^{-i(\omega_0+\omega_i)\tau}d\tau + e^{i\theta}\int_{-\infty}^{+\infty}\gamma_{12}^*(\tau)e^{i(\omega_0+\omega_i)\tau}d\tau\right] \quad (33)$$

When comparing the integrals of Equation 33 with the general definition of $G_{12}(V)$ in Equation 16, it is observed that $$\int_{-\infty}^{+\infty}\gamma_{12}(\tau)e^{-i(\omega_0+\omega_i)\tau}d\tau = G_{12}(\omega_0+\omega_i) = G_{12}(V_a) \quad (34)$$

$$\int_{-\infty}^{+\infty}\gamma_{12}^*(\tau)e^{i(\omega_0-\omega_i)\tau}d\tau = G_{12}^*(\omega_0-\omega_i) = G_{12}(V_b) \quad (35)$$

where the G function has been expressed in terms of $2\pi$ times the frequencies involved.

Inserting Equations 33, 34, and 35 into Equation 32, $$\Phi_{12}'(\omega_i) = \int_{-\infty}^{+\infty} I_1 I_2 |\gamma_{12}(\tau)|^2 e^{-\omega_i \tau} d\tau + \int_{-\infty}^{+\infty} I_0^2 e^{-\omega_i \tau} d\tau +$$
$$I_0\sqrt{I_1 I_2}[e^{-i\theta}G_{12}(\omega_0+\omega_i) + e^{i\theta}G_{12}^*(\omega_0-\omega_i)] \quad (36)$$

where $\omega_0$ is the frequency of the coherent background light.

As noted previously, the analyzer comprising tuned amplifiers 119, 120, 128, mixers 121, 124, 129, local oscillators 122, 125, and multipliers 127, 131, measure the function $\Phi_{12}^1(\omega_i)e^{-i\rho}$. If no coherent background were present, then the output from motor 131 could be represented by $\Phi_{12}(\omega)e^{-i\rho}$. These above-identified circuits are quite similar to a form of analyzer developed by H. Takahasi and H. Gamo, reported in the Proceedings of the Japan Electrical Communication Engineering Conference, I–28, November 1951, and thus do not comprise a part of the present invention. A similar form of cross-spectral analyzer is reported by Uberoi and Gilbert, in The Review of Scientific Instruments, vol. 30, No. 3, pp. 176–180, March 1959. In the multiplier 131, the frequency components $\omega_1 - \omega_2$ cancel out since they are present at both inputs.

In examining Equation 36, it is noted that a change in angle $\theta$ of the coherent background will affect only the third term which contains $e^{-i\theta}$ and $e^{i\theta}$. Therefore any variation in the output of multiplier 131, when only $\theta$ is adjusted, can be attributed to a change only in $$e^{-i\theta}G_{12}(\omega_0+\omega_i) + e^{i\theta}G_{12}^*(\omega_0-\omega_i)$$

When the effect of both phases $\rho$ and $\theta$ is considered, the terms of interest become $e^{-i\rho}[e^{-i\theta}G_{12}(\omega_0-\omega_i) +$
$$e^{i\theta}G_{12}^*(\omega_0-\omega_i)]$$

since the output of multiplier 131 is $\Phi_{12}'(\omega_i)e^{-i\rho}$.

The procedure for ascertaining $G_{12}(\omega_0+\omega_i)$ and $$G_{12}(\omega_0-\omega_i)$$

will now be described. By setting $\rho=0$, the output of multiplier 131, as $\theta$ is varied, changes according to the change in the real part of $$[e^{-i\theta}G_{12}(\omega_0+\omega_i)+e^{i\theta}G_{12}(\omega_0-\omega_i)]$$

This term may also be expressed as $$\{[G_{12}(\omega_0+\omega_i)+G_{12}(\omega_0-\omega_i)]e^{-i\theta}\}^R \quad (37)$$

Since the term $[G_{12}(\omega_0+\omega_i)+G_{12}(\omega_0-\omega_i)]$ of Equation 37 has a phase $H^1$, then Equation 37 may be expressed as $$|[G_{12}(\omega_0+\omega_i)+G_{12}(\omega_0-\omega_i)]|\cos(H^1-\theta) \quad (38)$$

Now, when $\theta$ is varied until $H'-\theta=0$, then maximum output is obtained from multiplier 131. When $\theta$ is varied until $H'-\theta=\pi$, then minimum output is obtained, such that $$\frac{\text{Max}-\text{Min}}{2} = |G_{12}(\omega_0+\omega_i)+G_{12}(\omega_0-\omega_i)| \quad (39)$$

Next, set $\rho=t_0\pi/2$ so that the term $e^{-i\rho}$ is reduced to merely $a-i\sin\rho$ value. This means that the output of multiplier 131, as $\theta$ is varied, changes according to the change in the imaginary part of $$[e^{-i\theta}G_{12}(\omega_0+\omega_i)+e^{i\theta}G_{12}^*(\omega_0-\omega_i)]$$

This term may also be expressed as $$\{[G_{12}(\omega_0+\omega_1)-G_{12}(\omega_0-\omega_1)]e^{-i\theta}\}^I \quad (40)$$

where the superscript I indicates the imaginary part only. Since the term $[G_{12}(\omega_0+\omega_1)-G_{12}(\omega_0-\omega_1)]$ has a phase $H^2$, then Equation 40 may be expressed as $$|[G_{12}(\omega_0+\omega_1)-G_{12}(\omega_0-\omega_1)]|\sin(H^2-\theta) \quad (41)$$

Now, when $\theta$ is varied until $H^2-\theta=\pi/2$, then maximum output is obtained from multiplier 131. When $\theta$ is varied until $H^2-\theta=-\pi/2$, then minimum output is obtained, such that $$\frac{\text{Max}-\text{Min}}{2}=|G_{12}(\omega_0+\omega_1)-G_{12}(\omega_0-\omega_1)| \quad (42)$$

Having the values of Equations 39 and 42, coupled with the values of $H^1$ and $H^2$ (since the values of $\theta$ are known), it is a simple matter to calculate $G_{12}(\omega_0+\omega_1)$ and $G_{12}(\omega_0-\omega_1)$ by the following equations, in which G represents $G_{12}(\omega_0-\omega_1)$ and $G^1$ represents $G_{12}(\omega_0-\omega_1)$.

$$\begin{aligned}G+G'&=|G+G'|e^{iH^1}\\+G-G'&=|G-G'|e^{iH^2}\\\hline G&=\frac{|G+G'|e^{iH^1}+|G-G'|e^{iH^2}}{2}\end{aligned} \quad (43)$$

Subtracting, instead of adding the two equations above, it is seen that $$G'=\frac{|G+G'|e^{iH^1}-|G-G'|e^{iH^2}}{2} \quad (44)$$

Thus, for any set value of $\omega_1$ in tuned amplifiers 119 and 120, the values of the complex cross spectrum densities $G_{12}(\omega_0+\omega_1)$ and $G_{12}(\omega_0-\omega_1)$ for the incident beams 1 and 2 may be found. Amplifiers 119 and 120 may now be tuned to a new $\omega_1$. In this way, the entire frequency spectrum of the incident light beams 1 and 2 may be found when using a coherent light background in the circuit of FIGURE 9.

Since the actual value of $\theta$ in FIGURE 9 may be difficult to measure, mirrors 116 and 112, together with photodetector 134 are provided to generate a signal $A(1+\cos\omega t)$ which is phase shifted by unit 133 and then applied to one input of the two-phase motor 132. The other input to motor 132 is provided from multiplier 131 via amplifier 131', so that angle $\theta$ is equal to $\psi$. Thus, the quantity $\psi$ may be used, together with $\rho$, for determining the values of $G_{12}(\omega_0+\omega_1)$ and $G_{12}(\omega_0-\omega_1)$. This is the same technique as utilized in the preceding embodiments.

It may therefore be appreciated that the novel concept embodied in FIGURE 9 is the use of the coherent background beams 134a and 135 which are respectively superposed upon incident beams 1 and 2 so that complete information concerning the cross-spectrum function $G_{12}(V)$ may be obtained.

FIGURE 10 shows another embodiment of the cross-spectral density analyzer using coherent background which has less complex electronic circuitry, but which requires at least two different interference filters to selectively eliminate either $G_{12}(\omega_0+\omega_1)$ or $G_{12}(\omega_0-\omega_1)$ from appearing at its output. The optical portion of this embodiment is the same as that shown in FIGURE 9, and so it is not shown in detail in FIGURE 10. Incident beams 1 and 2 are respectively superposed on the coherent beams (phase shifted by $\theta$) at photodetectors 143 and 144. The output currents therefrom are passed through amplifiers 143 and 144, respectively, which are selectively tuned at $\omega_1$. After multiplication in 145, any change in the output of amplifier 146 (tuned at $\omega$, where $\theta=\omega t$) when $\theta$ is varied is due to the sum of $$G_{12}(\omega_0+\omega_1)+G_{12}(\omega_0-\omega_1).$$

In order to determine each of these terms separately, however, one of them must be selectively filtered so that only the other remains. This is accomplished by utilizing an interference filter 140 through which the light beams pass.

The procedure is as follows. Select a filter 140 which prevents the transmission of incident beam frequencies represented by $(\omega_0-\omega_1)$. Therefore, as phase $\theta$ is varied (or $\psi$ when modulating $\theta$ and using synchronous detection), the output varies according to the real part of $G_{12}(\omega_0+\omega_1)e^{-i\theta}$, which may be expressed as $$|G_{12}(\omega_0+\omega_1)|\cos(\alpha-\theta)$$

where $\alpha$ is the phase of $G_{12}(\omega_0+\omega_1)$. When maximum signal output is obtained, then $\theta=\alpha$. The value of $|G_{12}(\omega_0+\omega_1)|$ may be derived from the $$\frac{\text{Max}-\text{Min}}{2}$$

equation.

Next select a filter 140 to cancel the term $G_{12}(\omega_0+\omega_1)$ from the output, leaving only $G_{12}(\omega_0-\omega_1)e^{-i\theta}$ to vary according to $\theta$. The complete information about $G_{12}(\omega_0-\omega_1)$ may then be ascertained in a manner explained above. Thus, both $G_{12}(\omega_0+\omega_1)$ and $G_{12}(\omega_0-\omega_1)$, for any set value of $\omega_1$, may be found.

While representative embodiments of the invention have been disclosed and described, further modifications may become apparent to those skilled in the art without departing from the spirit of the invention as expressed in the appended claims.

What is claimed is:

1. Apparatus for the measurement of the phase angle of the phase coherence factor of first and second beams of coherent light, comprising in combination: a first photodetector means responsive to said first light beam for generating a first output current, a second photodetector means responsive to said second light beam for generating a second output current, correlator means responsive to said first and second currents for producing an output indicative of the cross correlation function between said first and second light beams at said photodetectors, an indicator connected to the output of said correlator means, said indicator producing an indication of a maximum output of said correlator, a coherent background source of light, means for producing first and second equal intensity portions of coherent light from said source, means for respectively superposing said first and second portions of said coherent light background on said first and second beams at said first and second photodetectors, and means for selectively changing the phase relationship between said first and second coherent portions to the phase relationship which produces a maximum correlation output indication, said last-named phase relationship being indicative of the phase angle of said phase coherence factor.

2. Apparatus according to claim 1 in which said phase changing means comprises means for varying the optical path traveled by one of said coherent light portions.

3. Apparatus according to claim 1 in which said phase changing means is periodically modulated, and which further includes means for generating a signal corresponding to said modulated phase, means for variably phase shifting said signal, and synchronous detection means responsive to both said phase shifted signal and said correlator output signal.

4. Apparatus according to claim 3 wherein said synchronous detection means comprises a two phase motor.

5. Apparatus according to claim 3 in which said phase changing means comprises means for varying the optical path traveled by one of said coherent light portions.

6. Apparatus according to claim 1 in which said correlator includes means for generating a signal representing the Fourier transformation of said cross correlation function.

7. Apparatus according to claim 6 which further includes interference filter means inserted in the paths of said superposed beams for selectively filtering out one sideband of the spectrum of said first and second beams.

8. Apparatus for the measurement of the phase angle of the phase coherence factor of first and second beams of coherent light, comprising in combination: a first photodetector means responsive to said first light beam for generating a first output current, a second photodetector means responsive to said second light beam for generating a second output current, first means for selectively changing the phase relationship between said first and second beams, correlator means responsive to said first and second currents for producing an output indicative of the cross correlation between said first and second light beams at said photodetectors, an indicator connected to the output of said correlator means, said indicator producing an indication of a maximum output of said correlator, a coherent background source of light, means for producing first and second equal intensity portions of coherent light from said source, means for respectively superposing said first and second portions of said coherent light background on said first and second beams at said first and second photodetectors, and second means for selectively changing the phase relationship between said first and second coherent portions to the phase relationship which produces a maximum correlation output indication, said last-named phase relationship being indicative of the phase angle of said phase coherence factor.

9. Apparatus according to claim 8 in which said first phase changing means comprises means for selectively delaying one of said photodetector currents.

10. Apparatus according to claim 8 in which said first phase changing means comprises means for selectively varying the optical path traveled by one of said first and second beams.

11. Apparatus according to claim 8 in which said second phase changing means comprises means for varying the optical path traveled by one of said coherent light portions.

12. Apparatus according to claim 8 in which said second phase changing means is periodically modulated, and which further includes means for generating a signal corresponding to said modulated phase, means for variably phase shifting said signal, and synchronous detector means responsive to both said phase shifted signal and said correlator output signal.

13. Apparatus according to claim 12 in which said synchronous detector is a two phase motor.

14. Apparatus according to claim 12 in which said first phase changing means comprises means for selectively delaying one of said photodetector currents.

15. Apparatus according to claim 12 in which said first phase changing means comprises means for selectively varying the optical path traveled by one of said first and second beams.

16. Apparatus for the measurement of the phase angle of the phase coherence factor $\gamma_{12}(\tau)$ of first and second light beams, where $(\tau)$ indicates that the coherence time is not zero at first and second photodetectors, comprising in combination: a source of coherent light, means for producing first and second equal intensity beams of coherent light from said source, means for selectively changing the optical path length of one of said coherent beams so as to change the phase between said coherent beams, means for respectively superposing said first coherent beam on said first light beam at said first photodetector, and for superposing said second coherent beam on said second light beam at said second photodetector, said first and second photodetectors respectively producing first and second currents proportional to the intensity of their respective superposed beams, variable time delay means, which includes a delay of zero seconds, for selectively delaying one of said currents with respect to the other current, a multiplier responsive to said one delayed current and said other current, and an integrator responsive to the output from said multiplier, an indicator connected to the output of said multiplier for indicating the particular optical path length which produces a maximum output from said integrator, said last-named optical path length being indicative of the phase angle of said phase coherence factor.

17. Apparatus for the measurement of the cross spectral density $G_{12}(\nu)$ of first and second light beams at first and second photodetectors, where $(\nu)$ is the frequency under examination, comprising in combination: a source of coherent light, means for producing first and second equal intensity beams of coherent light from said source, means for selectively changing the optical path length of one of said coherent beams so as to change the phase between said coherent beams, means for respectively superposing said first and second coherent beams on said first and second beams at said first and second photodetectors, said first and second photodetectors respectively producing first and second currents proportional to the intensity of their respective superposed beams, and means responsive to said first and second currents for generating the Fourier transform of the cross correlation function of said superposed beams at said first and second photodetectors.

18. Apparatus according to claim 17 which further includes interference filter means inserted in the paths of said superposed beams for selectively filtering out one sideband of the spectrum of said first and second beams.

19. Apparatus for the measurement of the phase angle of the phase coherence factor of first and second beams of coherent electromagnetic radiations comprising in combination: a first electromagnetic detector means responsive to said first beam for generating a first output current, a second electromagnetic detector means responsive to said second beam for generating a second output current, a correlator means responsive to said first and second currents for producing an output indicative of the cross correlation function between said first and second beams at said detectors, an indicator for indicating a maximum output from said correlator means, a coherent background source of electromagnetic radiations, means for producing first and second portions of coherent electromagnetic radiations from said source, means for respectively superimposing said first and second portions of said coherent background on said first and second beams at said first and second detectors and means for selectively changing the phase relationship between said first and second portions to the phase relationship which produces a maximum output from said correlator, said last-named phase relationship being indicative of the phase angle of said phase coherence factor.

References Cited in the file of this patent

UNITED STATES PATENTS 2,627,202    Strong et al. _____ Feb. 3, 1953

OTHER REFERENCES

Twiss et al.: "Interferometry of the intensity fluctuations in light I," Proceedings of The Royal Society of London, vol. 242 A, 1957, pages 300–324.

Twiss et al.: "Interferometry of the Intensity of fluctuations in light II," Proceedings of The Royal Society of London, vol. 243 A, 1958, pages 291–319.

UNITED STATES PATENT OFFICE
CERTIFICATE OF CORRECTION

Patent No. 3,160,696                      December 8, 1964

Hideya Gamo

It is hereby certified that error appears in the above numbered patent requiring correction and that the said Letters Patent should read as corrected below.

Column 3, line 9, for "respectviely" read -- respectively --; line 60, strike out the comma, both occurrences; column 4, line 7, for "reesultant" read -- resultant --; line 67, for "$\gamma12^1$" read --$\gamma12'$ --; column 5, line 39, for the right-hand portion of the formula reading:

$$\rbrack^{R'} \quad\quad \text{read} \quad\quad \rbrack^{R},$$

column 8, line 23, column 12, lines 31, 33, 39 and 40, for "$\alpha$", each occurrence, read -- $\gamma$ --; same column 8, line 70, for "$\gamma^{12}(\tau)$" read -- $\gamma_{12}(\tau)$ --; column 11, line 3, for "$V_{20}|2$" read -- $V_{20}|^2$ --; column 12, line 25, for "mulitplying" read -- multiplying --; same column 12, Equations 26, 27, 28, 30 and 31, the "v", each occurrence, should be in the upper case -- V --; line 73, for "=nl" read -- n=1 --; line 75, for "$v_0$" read -- $V_0$ --; column 13, lines 42 and 45, exponent "1", each occurrence should be a prime; column 13, line 60, for $$(w_o\tau+^\theta) \quad\quad \text{read} \quad\quad (w_o\tau+\theta)$$

column 14, line 17, for " $\Phi_{12}^1$" read -- $\Phi_{12}'$ --; lines 32 and 35, for "$ei^\theta$", each occurrence, read -- $e^{i\theta}$ --; same lines 32 and 35, for "$e\text{-}^{i\theta}$", each occurrence, read -- $e^{-i\theta}$ --; same column 14, lines 49 and 75, for "$e^-i^\theta$", each occurrence, read -- $e^{-i\theta}$ --; lines 49 and 75, for "$ei^\theta$", each occurrence, read -- $e^{i\theta}$ --; column 15, line 7, for "($H^2$-$\theta$" read -- ($H^2$-$\theta$) --; line 20, for "($\omega_o$-$\omega_i$), first occurrence, read -- ($\omega_o$+$\omega_i$) --; same column 15, equations 43 and 44, for "$G'$", each occurrence, read -- $G^1$ --.

Signed and sealed this 18th day of May 1965.

(SEAL)
Attest:

ERNEST W. SWIDER                           EDWARD J. BRENNER
Attesting Officer                              Commissioner of Patents